United States Patent
Marson

(10) Patent No.: US 8,465,172 B2
(45) Date of Patent: Jun. 18, 2013

(54) LIGHTING MODULE WITH DIFFRACTIVE OPTICAL ELEMENT

(75) Inventor: Jonathan L. Marson, Hillsboro, OR (US)

(73) Assignee: Phoseon Technology, Inc., Hillsboro, OR (US)

( * ) Notice: Subject to any disclaimer, the term of this patent is extended or adjusted under 35 U.S.C. 154(b) by 48 days.

(21) Appl. No.: 12/641,161

(22) Filed: Dec. 17, 2009

(65) Prior Publication Data

US 2011/0149565 A1 Jun. 23, 2011

(51) Int. Cl.
*F21V 7/04* (2006.01)

(52) U.S. Cl.
USPC .... 362/235; 362/249.02; 362/800; 362/249.1

(58) Field of Classification Search
USPC ............. 362/800, 235, 249.1, 249.02, 249.11
See application file for complete search history.

(56) References Cited

U.S. PATENT DOCUMENTS

| | | | |
|---|---|---|---|
| 5,857,767 A | 1/1999 | Hochstein | |
| 5,936,353 A | 8/1999 | Triner et al. | |
| 6,200,134 B1 | 3/2001 | Kovac et al. | |
| 6,457,823 B1 | 10/2002 | Cleary et al. | |
| 6,501,084 B1 | 12/2002 | Sakai et al. | |
| 6,523,976 B1 * | 2/2003 | Turnbull et al. | 362/231 |
| 6,683,421 B1 | 1/2004 | Kennedy et al. | |
| 6,692,250 B1 | 2/2004 | Decaudin et al. | |
| 6,871,982 B2 * | 3/2005 | Holman et al. | 362/331 |
| 2001/0046652 A1 | 11/2001 | Ostler et al. | |
| 2002/0187454 A1 | 12/2002 | Melikechi et al. | |
| 2003/0043582 A1 | 3/2003 | Chan et al. | |
| 2003/0081096 A1 | 5/2003 | Young | |
| 2005/0151136 A1 | 7/2005 | Liu | |

(Continued)

FOREIGN PATENT DOCUMENTS

| | | |
|---|---|---|
| DE | 19619154 A1 | 6/1997 |
| DE | 10127171 A1 | 12/2001 |
| EP | 0879582 A1 | 11/1998 |
| EP | 1158761 A1 | 11/2001 |

(Continued)

OTHER PUBLICATIONS

Data Sheet G*SiC Technology Super Blue LEDS No. C430-CB290-E1200, manufactured by Opto Semiconductors, May 1, 1999, 8 pages.

(Continued)

*Primary Examiner* — Anabel Ton
(74) *Attorney, Agent, or Firm* — Alleman Hall McCoy Russell & Tuttle LLP

(57) ABSTRACT

A lighting module having an array of light-emitting elements on a substrate, at least one diffractive optical element arranged to receive light from the light-emitting elements and partially collimate the light. A method of packaging a lighting module including mounting at least one array of light-emitting elements on a substrate in a package, and enclosing the package with a window, the window has a diffractive optical element on a surface of the window closest to the array, the diffractive optical element arranged to partially collimate the light. A lighting module having an array of light-emitting elements on a substrate, at least one diffractive optical element arranged to receive light from the light-emitting elements and scatter the light into a random emission pattern to produce a uniform irradiance at a target surface.

20 Claims, 4 Drawing Sheets

U.S. PATENT DOCUMENTS

| | | |
|---|---|---|
| 2006/0102914 A1 | 5/2006 | Smits et al. |
| 2006/0214123 A1 | 9/2006 | Liang |
| 2006/0233501 A1 | 10/2006 | Sampson |
| 2008/0157114 A1 | 7/2008 | Basin et al. |
| 2010/0027240 A1* | 2/2010 | Chang .................. 362/97.1 |

FOREIGN PATENT DOCUMENTS

| | | |
|---|---|---|
| WO | 9507731 A1 | 3/1995 |
| WO | 0059671 A1 | 10/2000 |
| WO | 0067048 A2 | 11/2000 |
| WO | 0211640 A2 | 2/2002 |
| WO | 0213231 A2 | 2/2002 |
| WO | 03023875 A2 | 3/2003 |

OTHER PUBLICATIONS

Data Sheet for 5.0 mm Blue Series LEDs No. LNG992CFB, manufactured by the Panasonic Corporation, Mar. 2001, 1 page.

Data Sheet for 3.0 mm Blue Series LEDs No. LNG997CKB, manufactured by the Panasonic Corporation, Mar. 2001, 1 page.

Data Sheet for G*SiC Technology Ultraviolet LEDs No. C395-MB290-E0400, manufactured by Cree, Inc., 2 pages.

* cited by examiner

LIGHTING MODULE WITH DIFFRACTIVE OPTICAL ELEMENT

BACKGROUND

Ultraviolet (UV) curing has many applications in printing, coating and sterilization. UV-sensitive materials generally rely upon a particular amount of energy in the form of UV light to initiate and sustain the curing process (polymerization) within the materials. UV light fixtures, commonly known as UV lamps, provide the UV light to the materials for curing.

Using arrays of light emitting diodes (LEDs) in UV curing has several advantages over using arc lamps, including lower power consumption, lower cost, cooler operating temperatures, etc. Generally, the arrays consist of individual LED elements arranged in an X-Y grid or linear array on a substrate.

In curing applications, one challenge exists in having a high enough irradiance during the time period allowed to cause the polymerization or curing to occur. One means of increasing the irradiance in LED UV lamps involves reducing the divergence of the light. LEDS generally have light that exits at all angles. Reducing that divergence increases the light available at a target surface, increasing the irradiance.

DETAILED DESCRIPTION OF THE EMBODIMENTS

Figure 1:
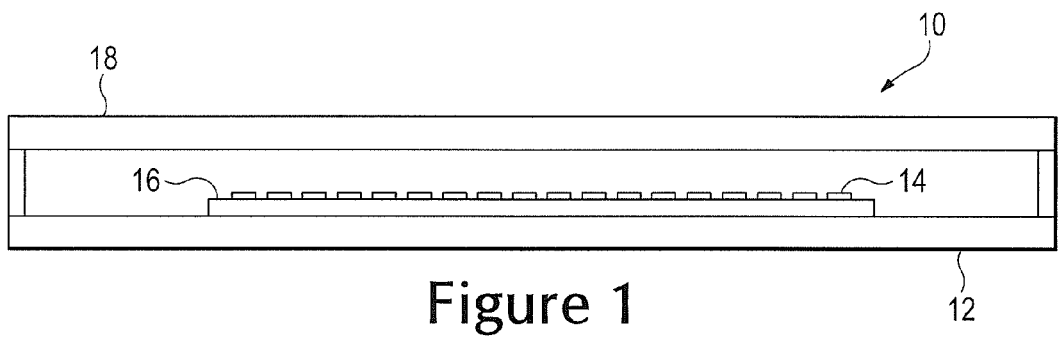
FIG. 1 shows a side view of an embodiment of a lighting module.

FIG. 1 shows an embodiment of a lighting module. The lighting module may have many components; some of them may be configured differently than those shown here. The lighting module 10 of FIG. 1 has an array of light-emitting elements such as 14, arranged on a substrate 16 inside a package 12. Package 12 will generally be sealed against exposure to particulates and the atmosphere by a cover or lid 18. The cover or lid 18 is generally transparent to allow light from the light-emitting elements to exit the package to reach a target to be exposed to the light. Because of this, the cover will be referred to here as a window.

The lighting module may have many other components, such as a voltage supply for providing power to the array of light-emitting elements, a controller for controlling the supply of power to the elements in response to irradiance needs, heat control elements such as chillers, heat sinks, fans, etc., temperature monitors and controls, among others. For purposes of simplifying this discussion, those elements will generally not be discussed here. No limitation or removal of these elements should be assumed because of any lack of discussion about these elements.

Figure 2:
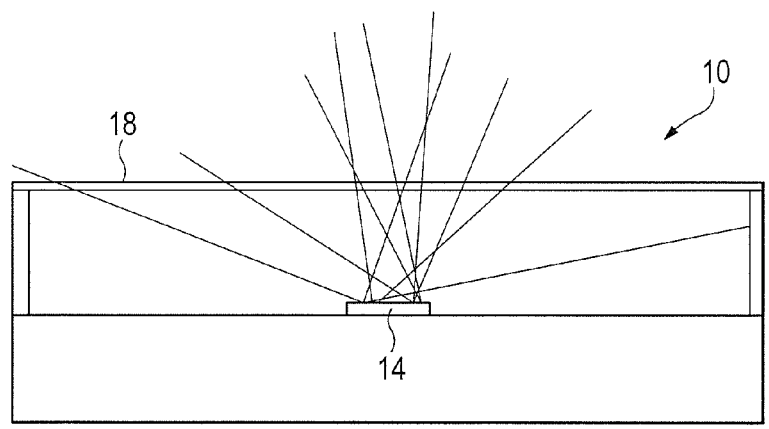
FIG. 2 shows an example of an illumination pattern from an array of light-emitting elements.

In operation, light-emitting elements such as 14 of FIG. 1 may be light-emitting diodes, or LEDs. LEDs have several advantages in low power consumption and low heat generation when compared to traditional arc lamps. However, the light emitting from LEDs has a lambertian distribution with respect to the emission angle of light where an emission angle of 90 degrees is normal to the emitting surface of the LED. FIG. 2 shows an example of an illumination profile of an LED as the light-emitting element 14.

In order to increase the irradiance in a particular region, optical elements are used to direct and guide the light. These optical elements may include reflectors to capture light that is directed to the sides of the package or that is internally reflected off of the window. Other optical elements, such as lenses, are used to gather and guide the light toward a particular target or target region.

In curing applications, a key performance issue is the ability to project enough light to a target region to achieve polymerization of the coating or other material to be cured, in the amount of time allowed for the curing. The ability to use most of the light from a lighting module makes this goal attainable. Generally, the optical elements used in these lighting modules are reflective or refractive elements. Refractive elements generally cause the light to change direction and include lenses that can be used to focus or collimate light. These contrast with diffractive elements, such as patterns or gratings. In diffraction, light acts as a wave, bending around an obstacle in its path, such as a grating. One example of a diffractive element is a hologram, which is created by recording the diffraction pattern of coherent light on a photographic plate. An example of this may be seen in U.S. Pat. No. 4,607,914 by Fienup titled, "Optical system design techniques using holographic optical element." These natural holograms, however, are difficult to mass produce.

Figure 3:
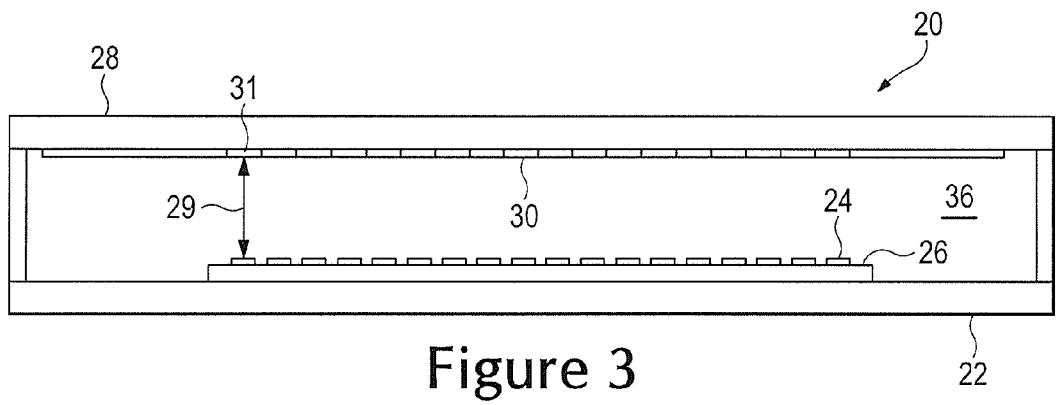
FIG. 3 shows a side view of an embodiment of a lighting module having a diffractive optical element.

It is possible to use a diffractive element to concentrate more of the light emitted from light-emitting elements having a divergent or lambertian distribution of light. This results in a higher irradiance being achieved with a same array of light-emitting elements than would be otherwise achievable. FIG. 3 shows an example of a lighting module having a diffractive optical element, such as a hologram.

In FIG. 3, the lighting module 20 generally includes at least one array of light-emitting elements such as 24 on a substrate 26. The package 22 has a window 28 that allows light emitted from the array to exist the package. The window 28 has a surface that faces the array of light emitting elements upon which a diffractive optical element 30 resides. The diffractive optical element 30 may be a hologram or other diffractive element imaged into an emulsion that is coated on the glass or may be a pre-existing element that is adhere to the glass, as examples. The diffractive element may also be mounted on the outer surface of the glass or suspended in the package itself. The diffractive optical element may be an array of diffractive optical elements, each element in the array of diffractive optical elements such as 31 corresponding to each light-emitting element.

Generally, a gap 36 will exist between the diffractive optical element 30 and the array of light-emitting elements such as 24. This gap may have a particular distance 29, which will be discussed in more detail with regard to FIG. 7. In the embodiment of FIG. 3, the gap 36 is filled with air.

Figure 4:
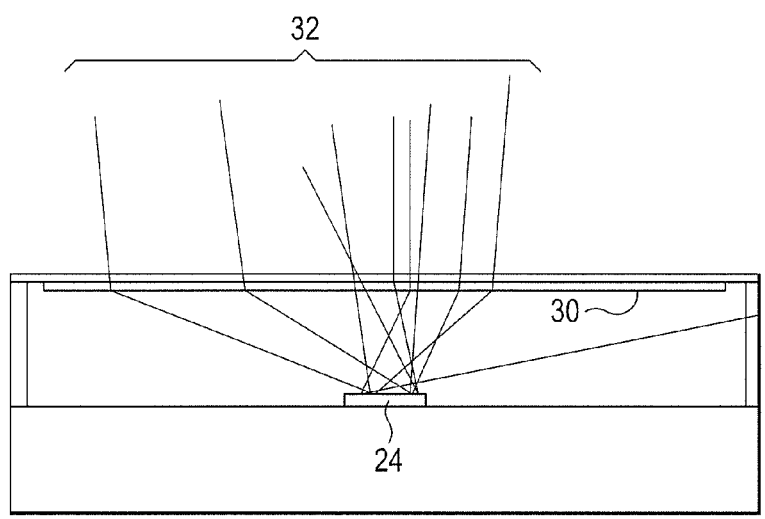
FIG. 4 shows an example of an illumination pattern from an array of light-emitting elements in a module having a diffractive optical element.

The addition of the diffractive optical element 30 to the lighting module 20 alters the illumination profile of the module as can be seen in FIG. 4. The light emitted from the element 24 follows the same illumination profile of that shown in FIG. 2, except when the light reaches the diffractive optical element 30. As can be seen by the rays in the group 32, the light changes direction when encountering the diffractive optical element 30 and becomes partially collimated.

Partially collimated light is generally more desirable than fully collimated light for curing applications. If the light from the array of elements becomes fully collimated, hot spots on the target surface may result. This causes uneven curing, or curing too quickly which may lead to cracking or other failures of the coating or material being cured.

However, even with only partially collimated light, the irradiance at a given distance doubles when a diffractive optical element is used versus when one is not. In an experiment, a single blue LED was mounted in a fixture with a diffractive optical element arranged adjacent the LED. In this particular experiment, the diffractive optical element was a holographic optical element. The diffractive optical element would generally have a focal point along a first axis and would collimate the light along a second axis. The optical element was placed at varying distances to the LED and the results are shown in FIG. 5.

Figure 5:
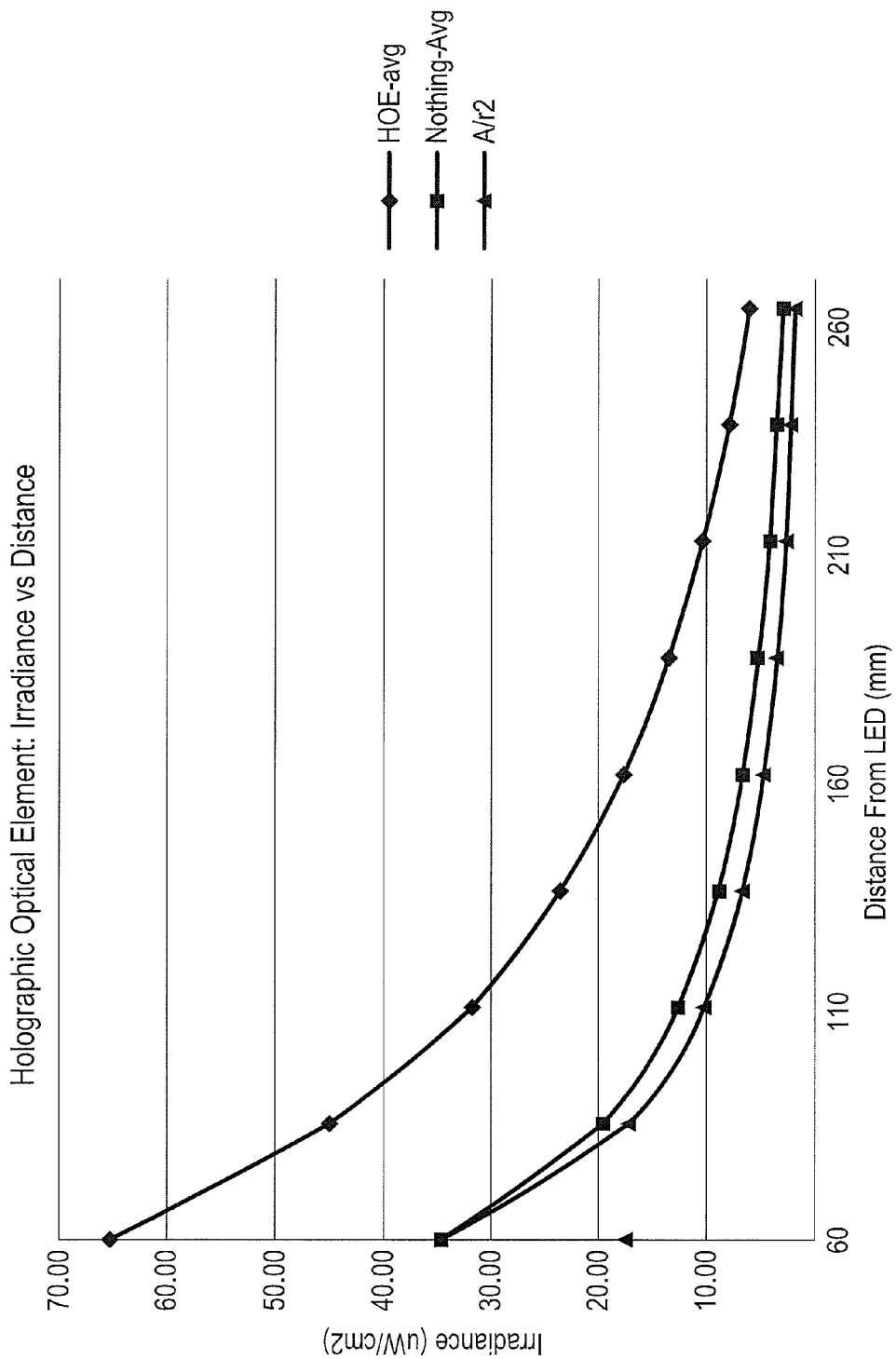
FIG. 5 shows a graph of irradiance versus distance results.

In FIG. 5 the upper line is using the diffractive, holographic optical element and the middle line is where nothing was used. As can be seen in the results, the irradiance seen at a given distance is doubled when the diffractive optical element is used across several different distances between the optical element and the LED. The use of the optical element causes the lambertian, divergent light from the LED to become partially collimated, almost acting like a point source.

In addition to, or alternatively, the diffractive optical element 30 may be arranged to scatter the light in a random emission pattern. This produces a more uniform distribution of light at a target work surface, such as one that would be located in the group 32. Generally, a uniform distribution of light will be discussed here as one that has less than 30% divergence over a designated area on the target surface.

Figure 6:
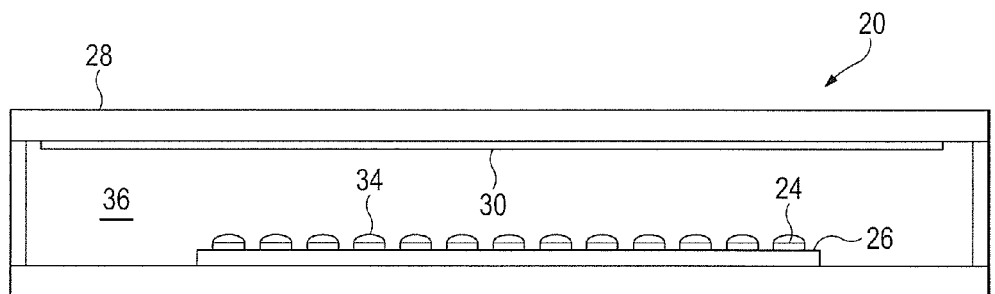
FIG. 6 shows an alternative embodiment of a lighting module having a diffractive optical element and a lens.

Other variations and modification of the lighting module are of course possible. One could employ a refractive lens element in conjunction with the diffractive optical element to further increase the light usable at a target distance. An example of such a lens is shown in FIG. 6. In FIG. 6, lens elements such as 34 have been added inside the package over the array of light-emitting elements. The lens element shown here is a single lens for each light emitting element, but may also take the form of an array of microlenses formed in a more monolithic fashion.

Figure 7:
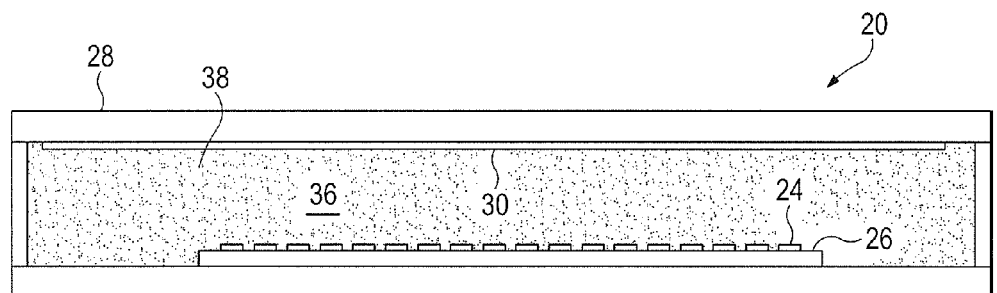
FIG. 7 shows an alternative embodiment of a lighting module having a diffractive optical element that employs a gel material inside the module.

In the example of FIG. 6, the gap 36 will more than likely be filled with air. However, it is possible to fill the gap 36 with other materials. FIG. 7 shows an embodiment without the lens element 34, but in which the gap 36 is filled with a gel material 38 during packaging. The gel material is selected to have the same index of refraction as the window the light-emitting elements or both, being 'index-matched.' The gel material may assist in gathering the light that will ultimately strike the diffractive optical element 30.

Figure 8:
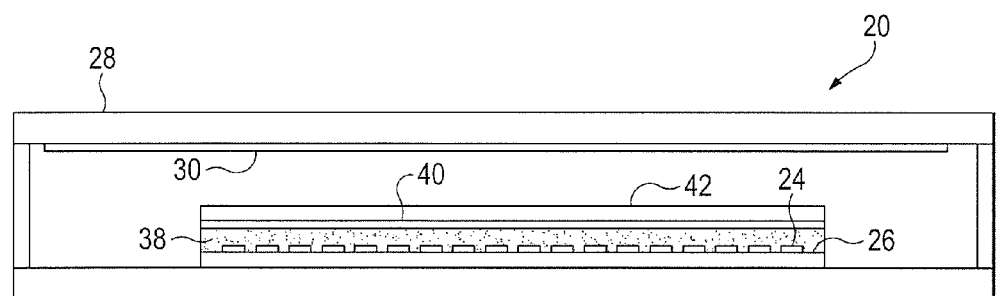
FIG. 8 shows an embodiment of a lighting module having two diffractive optical elements.

As discussed above, it is possible that the diffractive optical element may be used to collimate the light or scatter the light. Variations of the diffractive optical element may involve using two or more elements. FIG. 8 shows an embodiment using two diffractive optical elements in a particular configuration of packaging, which should not be viewed as a limitation on the scope of the invention.

In FIG. 8, the light-emitting elements such as 24 reside on the substrate 26 within the package. A gel material 38 covers the light-emitting elements. A plate, slide or other transparent substrate 42 is arranged adjacent the array of light-emitting elements, typically on the surface of the gel. The substrate has on one of its surfaces a diffractive optical element 40. The diffractive optical element 40 is shown as being on the underside of the substrate, but it could also reside on the top. A second diffractive optical element 30 resides on the window 28. Again the diffractive optical element 30 is shown on the underside, but it could also reside on the top of the window.

This allows the effects of the diffractive optical elements to be combined. One could be used to partially collimate the light and the other to then scatter the light to form a random emission pattern. The use of the first element in this example allows more light to be used in the scattering. These options generally all have the same packaging and manufacturing requirements, allowing for flexibility in the combination of diffractive optical elements, transparent substrates and windows, and lenses or no lenses.

Manufacturing of the lighting module will depend upon the particular variation used with regard to these options. Generally, manufacturing will involve placing at least one array of light-emitting elements into a package and connecting the array to its power supply. A lens element may be added or not. If no lens element is used, the package may be filled with an index-matched material, or air, as examples. The window with the diffractive optical element would then be placed on the package and the package sealed.

Other variations on this process may also occur. For example, the package could be manufactured in reverse with the window and package provided before the substrate, with the substrate upon which the LEDs are mounted used to enclose the package. The window may be provided with the diffractive optical element on its surface, or the manufacturing process may include the formation of the diffractive optical element on the window surface. As mentioned previously, this may involve patterning a material on the window surface to form the diffractive optical element by hardening an emulsion into the diffractive pattern. The imaging may also be performed on multiple diffractive elements arranged in a stack before imaging. These are just some examples of the different variations possible. No limitation is intended and none should be implied from the examples given above.

Thus, although there has been described to this point a particular embodiment for a lighting module having a diffractive optical element, it is not intended that such specific references be considered as limitations upon the scope of this invention except in-so-far as set forth in the following claims.

What is claimed is:

1. A lighting module, comprising:
   an array of light-emitting elements on a substrate;
   a package containing the array of light-emitting elements and the substrate, the package enclosed with a window, wherein the window has two surfaces;
   an array of diffractive optical elements mounted to one of the surfaces of the window such that a gap exists between the array of diffractive optical elements and the array of light-emitting elements, each diffractive optical element corresponding to a light-emitting element, the diffractive optical elements arranged to receive light from the light-emitting elements and so as to only partially collimate the light;
   a lens element arranged adjacent to each light-emitting element to capture the light from the element; and
   a target surface arranged at a distance from the lighting module to receive a uniform distribution of the partially collimated light.

2. The lighting module of claim 1, wherein the uniform distribution of the partially collimated light comprises a distribution having less than 30% divergence over the target surface.

3. The lighting module of claim 1, wherein a second diffractive optical element is arranged to scatter light into a random emission pattern to produce a uniform irradiance at a target work surface.

4. The lighting module of claim 1, wherein each of the diffractive optical elements comprises a holographic optical element.

5. The lighting module of claim 1, wherein each of the diffractive optical elements has a focal point in a first axis.

6. The lighting module of claim 3, wherein the second diffractive optical element has a focal point in a first axis.

7. The lighting module of claim 5, wherein each of the diffractive optical elements partially collimates the light in a second axis.

8. The lighting module of claim 1, wherein the gap exists between the lens element and the window.

9. The lighting module of claim 1, wherein the gap is filled with one of either air or a gel material.

10. The lighting module of claim 9, wherein the gel material comprises a material that is index matched to at least one of the window or the light-emitting elements.

11. A method of packaging a lighting module, comprising:
mounting at least one array of light-emitting elements on a substrate in a package; and
enclosing the package with a window, the window having two surfaces, the window having an array of diffractive optical elements mounted to the surface closest to the light-emitting element array such that a gap exists between the array of diffractive optical elements and the array of light-emitting elements, each diffractive optical element corresponding to a light-emitting element, the array of diffractive optical elements arranged at a distance to only partially collimate light at a target surface arranged at a distance from the lighting module so as to receive a uniform distribution of the partially collimated light.

12. The method of claim 11, wherein the diffractive optical elements are holographic optical elements.

13. The method of claim 11, wherein the window has pre-existing diffractive optical elements on the surface.

14. The method of claim 11, further comprising: dispensing a gel over the array of light-emitting elements; and mounting a transparent substrate on the gel, the transparent substrate having a second diffractive optical element on a surface.

15. The method of claim 14, wherein the second diffractive optical element comprises an array of diffractive optical elements.

16. The method of claim 11, further comprising arranging a lens adjacent to each light-emitting element inside the package.

17. The method of claim 11, further comprising allowing the gap to fill with air.

18. The method of claim 11, further comprising filling the gap with a gel material.

19. The method of claim 18, further comprising filling the gap with a gel material that is index matched to at least one of the window and the light-emitting elements.

20. A method comprising:
projecting partially collimated light from a lighting module to a target surface arranged at a distance from the lighting module so as to receive a uniform distribution of the partially collimated light, wherein the lighting module includes at least one array of light-emitting elements mounted on a substrate in a package; and a window enclosing the package, the window having two surfaces and an array of diffractive optical elements mounted to one of the surfaces of the window such that a gap exists between the array of diffractive optical elements and the array of light-emitting elements, each diffractive optical element corresponding to a light-emitting element, the diffractive optical elements arranged to receive light from the light-emitting elements;
only partially collimating the light from the light-emitting elements via the diffractive optical elements; and
uniformly curing a material at the target surface in a predetermined amount of time.

* * * * *